United States Patent Office 2,757,179
Patented July 31, 1956

2,757,179

NEW METHOD OF PREPARING HALO-PHTHALIDE COMPOUNDS

Samuel Kushner, Nanuet, N. Y., and James H. Boothe, Montvale, and John Morton II, Allendale, N. J., assignors to American Cyanamid Company, New York, N. Y., a corporation of Maine No Drawing. Application May 3, 1952,
Serial No. 286,034

11 Claims. (Cl. 260—343.3)

This invention relates to a new method of preparing certain 3-methyl-4-halophthalide compounds and more particularly to a new method of preparing the class of compounds represented by the following general formula:

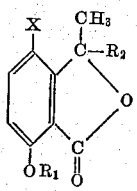

where X represents halogen; $R_1$ represents a member selected from the group consisting of hydrogen and lower alkyl radicals, for instance methyl, ethyl and propyl; and $R_2$ represents hydrogen, halogen, a hydroxy group, or an organic radical of the type to be more particularly described in subsequent paragraphs. While this class of compounds has not been previously reported, it is not intended that the compounds per se constitute a part of this invention since such compounds constitute a part of the subject matter of copending U. S. applications Ser. No. 286,023 (now U. S. Patent No. 2,704,288), Ser. No. 286,021 and Ser. No. 286,022 (now Patent No. 2,702,807) filed concurrently herewith. In the above-entitled applications, alternate methods of preparing the new compounds are also disclosed.

The above class of new compounds are useful in several fields of organic chemistry and particularly in the field of experimental chemistry where the new compounds are of great value as intermediates. The new compounds also possess fungicidal and antiseptic properties and may be employed in compositions prepared for use as fungicides and antiseptics. Therefore, a new and simple method for preparing the new class of compounds would obviously be a contribution to the art and it is with such a new and convenient method of preparation that this invention is concerned.

According to the new method of this invention, a 3-methylphthalide compound is halogenated to produce the corresponding 4-halo derivative in accordance with the following equation:

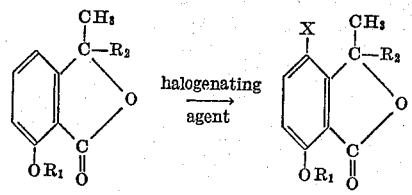

in which $R_1$ and $R_2$ are as previously defined. That the halogen atom should in each instance attach in the 4 position is unexpected and in attempting a synthesis of the new compounds by this method, a step was made in a direction opposed to prior art teaching. In previous reports, where the halogenation of phthalide compounds has been reported, the halogen substituent entered the lactone ring rather than the phenyl nucleus. For instance, see Annalen der Chemie 24, 280 (1887), where the bromination of a phthalide resulted in a bromo substituent in the 3 position. And even if the 3 position were blocked so that it would be impossible for a halogen substituent to attach in this position, it might be expected that the halogen substituent would enter the 6 position as a result of steric hindrance. While the reason for the halogen atom consistently entering the 4 position is not fully understood, it is believed to be due to the presence of the methyl group in the 3 position. However, applicants do not wish to be limited by chemical theory and it is intended that the invention cover this new and simple method of preparing the desired new class of compounds regardless of the mechanisms of the reaction.

As will be seen from the above equation, the radical designated by $R_2$ does not enter directly into the reaction whereby the new compounds are prepared and, as a result, this radical may vary widely. In fact, the only requirements of this radical are that it be one which is not readily halogenated nor decomposed and one that contains only a reasonable number of carbon atoms, for instance less than about 10, so as not to result in undue steric hindrance. For instance, the member designated by $R_2$ above may be hydrogen, halogen, a hydroxy group, or an organic radical. Illustrative of organic radicals which may suitably be designated by $R_2$ in the above equation are carboxyl radicals; carboxyl ester radicals, for instance carbethoxy, carbomethoxy, and carbobenzyloxy; alkoxy radicals, for instance ethoxy, methoxy, and propoxy; aryloxy radicals, for instance phenoxy; aralkoxy radicals, for instance benzyloxy; and alkyl radicals substituted by one or more carboxyl or carboxyl ester groups as may be illustrated by radicals derived from glutaric, succinic, and malonic acid or esters.

Compounds of the above general formula in which $R_2$ represents a carboxyl group or a carboxyl ester group can be prepared by either one of two alternate procedures. In other words, the compound can originally be prepared with a free carboxyl group and a subsequent esterification performed to give the corresponding ester, or the compound can be originally prepared containing a carboxyl ester group and this group hydrolyzed to produce the free acid. Likewise, compounds of the above general formula in which $R_2$ represents a hydroxy or an alkoxy group can be prepared in either one of two alternate ways. That is, the compound can be prepared containing a hydroxy group and this group alkylated to give a corresponding alkoxy compound or the phthalide can be prepared containing an alkoxy group and this group hydrolyzed to give the corresponding hydroxy derivative. Of course, such procedures can also be employed in producing phthalide compounds in which $R_1$ represents a hydroxy group or an alkoxy radical.

It is an advantage of the invention that any one of several halogenating agents can be satisfactorily employed. For instance in chlorination one can employ sulfuryl chlorides, elementary chlorine or a hypochlorite, for instance sodium hypochlorite, and in bromation one can employ elementary bromine or bromine compounds corresponding to the above-mentioned chlorine compounds. Such halogenating agents are well known to those skilled in the art.

The new reaction can be advantageously performed in the presence of an inert solvent. Examples of suitable solvents are water, benzene, and acetic acid, although the selection of a particular solvent will depend upon the particular halogenating agent to be employed. For instance when sodium hypohalites are employed it is usually advantageous to employ an aqueous solvent. This aqueous solution can then be treated with a strong mineral acid, for instance hydrochloric or sulfuric, to release the free halogen, which of course is the actual halogenating agent. If an elementary halogen is employed as the halogenating agent it is usually advantageous to use an organic solvent as illustrated by acetic acid. With the sulfuryl halides, organic solvents are also usually advantageous, although the preferred solvents in this instance are the hydrocarbon solvents as illustrated by benzene, petroleum ether and xylene.

It is also an advantage of the new process of this invention that a relatively wide range of operating conditions are available. For instance the new process of this invention can be performed at temperatures from about 0° C. to 100° C. depending upon the particular halogenating agent employed. With elementary chlorine, temperatures throughout the complete range set forth above are satisfactory, but with sodium hypohalites and sulfonyl halides, temperatures within the range of about 20° C. to 80° C. are more satisfactory. The time required for a reasonably complete reaction depends upon a number of variables, such as the particular temperature and halogenating agent employed but as a general rule from two to eight hours should be allowed at room temperature and a correspondingly shorter time, for instance one to four hours, at higher temperatures.

The invention will be more particularly illustrated by the following specific examples in which all parts are by weight unless otherwise indicated.

*Example I*

One half part by weight of 3-methyl-3-hydroxy-7-methoxypthalide is dissolved in 5 parts by volume of glacial acetic acid by heating to 75° C. The solution is cooled to 40° C., and 8 parts by volume of a solution containing an excess of chlorine in glacial acetic acid is added. After standing 3–4 hours at room temperature, the solution is concentrated to dryness in vacuo. The residual solids are crystallized to give 3-methyl-3-hydroxy-4-chloro-7-methoxyphthalide having a melting point of about 204° C. to 206° C., uncorrected.

*Example II*

One fifth part by weight of 3-hydroxy-3-methyl-4-chloro-7-methoxyphthalide is refluxed 2.5 hours in 10 ml. of 48% hydrobromic acid. The solution is cooled, filtered, and diluted with 10 ml. of water. After cooling in an ice bath, the crystalline precipitate 3-hydroxy-3-methyl-4-chloro-7-hydroxyphthalide is filtered off, washed with water, and dried.

*Example III*

One fifth part by weight of 3-hydroxy-3-methyl-4-chloro-7-methoxyphthalide is refluxed for one hour in 3 parts by volume of methanol and about .15 part by volume of concentrated sulfuric acid. Some insoluble material is formed during the refluxing. The mixture is cooled and diluted with water, and the product is filtered off and dried. This 3-methyl-4-chloro-3,7-dimethoxyphthalide is then purified by crystallization from methanol and water.

*Example IV*

One part by weight of 3-methyl-7-methoxyphthalide is dissolved in 20 parts by volume of glacial acetic acid and to the resulting solution there is added 40 parts by weight of glacial acetic acid containing one molar equivalent of chlorine. The resulting solution is allowed to stand several hours or overnight at room temperature, after which time the solvent is removed by evaporation to give 3-methyl-4-chloro-7-methoxyphthalide.

*Example V*

One part by weight of 3-methyl-3-carboxy-7-methoxyphthalide is dissolved in about 5–10 parts by volume of glacial acetic acid containing 1 molar equivalent of chlorine. The resulting solution is allowed to stand overnight at room temperature after which time the acetic acid solvent is removed by evaporation in vacuo to yield 3-methyl-3-carboxy-4-chloro-7-methoxyphthalide.

*Example VI*

To a mixture of 1.1 parts by weight of 3-methyl-3-carboxy-7-methoxyphthalide and 100 parts by volume of concentrated HCl there is added, with stirring, 7.4 parts by volume of 5% NaOCl solution. The reaction mixture is allowed to stand at room temperature for one and one-half hours and then evaporated to dryness. The resulting residue is extracted with acetone and the acetone soluble material crystallized from alcohol and water to give 3-methyl-3-carboxy-4-chloro-7-methoxyphthalide.

*Example VII*

One part by weight of 3-methyl-3-carboxy-4-chloro-7-methoxyphthalide is dissolved in 40 parts by volume of absolute alcohol. To the resulting solution there is added 0.5 part by volume of concentrated sulfuric acid and the solution refluxed for three hours. This solution is then evaporated to dryness and the resulting residue of ethyl 3-methyl-4-chloro-7-methoxyphthalide - 3 - carboxylate is purified by washing with water and an excess of sodium carbonate solution.

Ethyl 3-methyl-4-chloro-7-methoxyphthalide - 3 - carboxylate can also be prepared by chlorination of ethyl 3-methyl-7-methoxyphthalide-3-carboxylate in the same manner that the free acid was chlorinated in Example V.

*Example VIII*

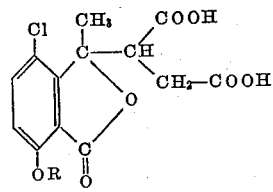

On half part by weight of the higher melting of the two *dl*-forms of (7-methoxy-3-methylphthalidyl) succinic acid is dissolved in 25 parts by weight of glacial acetic acid by heating. The solution is cooled to 40° C., and 4 parts by weight of a 6.1% solution of chlorine gas in acetic acid is added. The resulting solution is allowed to stand at room temperature for 3½ hours, after which the solution is filtered, and the filtrate evaporated to dryness in vacuo. The dry residue is taken up in a few parts by volume of benzene. Cooling of this benzene solution causes precipitation of crystals which are filtered off and dried. This crude *dl*-(4-chloro-7-methoxy-3-methylphthalidyl)succinic acid is purified by recrystallization, first from a mixture of ethyl acetate and petroleum ether and then from water.

The other *dl* form of (4-chloro-7-methoxy-3-methylphthalidyl)succinic acid is prepared in exactly the same manner except that the lower melting of the *dl*-forms of (7-methoxy-3-methylphthalidyl)succinic acid is employed as a starting material.

We claim:

1. The method of preparing compounds represented by the formula:

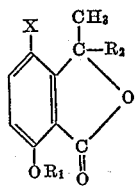

in which X represents a halogen substituent selected from the group consisting of chlorine and bromine, $R_1$ represents a substituent selected from the class consisting of hydrogen and lower alkyl radicals, and $R_2$ represents a substituent selected from the group consisting of hydrogen, chlorine, bromine, hydroxy, lower alkoxy, carboxy, carbolower alkoxy and the lower alkyl radicals substituted with from 1 to 3 carboxyl groups, which comprises contacting, in an inert solvent, a compound represented by the formula:

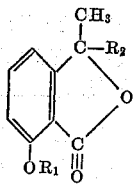

in which $R_1$ and $R_2$ are as defined above, with a halogenating agent selected from the group consisting of chlorine, bromine, sulfuryl bromide, sulfuryl chloride and hypochlorite salts in the presence of a mineral acid.

2. A method of preparing compounds represented by the formula:

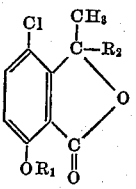

wherein $R_1$ represents a lower alkyl radical and $R_2$ represents a lower alkyl radical substituted with from one to three carboxyl groups, which comprises contacting a compound represented by the formula:

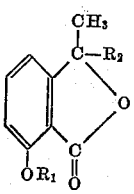

in which $R_1$ and $R_2$ are as defined above, with chlorine in an inert solvent.

3. A method of preparing (4-chloro-7-methoxy-3-methylphthalidyl)succinic acid which comprises contacting (7-methoxy-3-methylphthalidyl)succinic acid with chlorine in an acid solvent.

4. A method of preparing compounds represented by the formula:

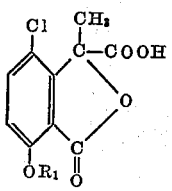

wherein $R_1$ represents a lower alkyl radical, which comprises contacting a compound represented by the formula:

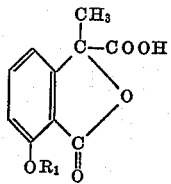

in which R is as defined above, with chlorine in an inert solvent.

5. The method of preparing 3-methyl-3-carboxy-4-chloro-7-methoxyphthalide which comprises contacting 3-methyl-3-carboxy-7-methoxyphthalide with chlorine in an inert solvent.

6. A method of preparing compounds represented by the formula:

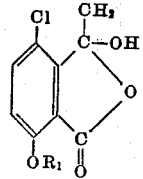

wherein $R_1$ represents a lower alkyl radical, which comprises contacting a compound represented by the formula:

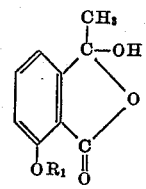

in which $R_1$ is as defined above with chlorine in an inert solvent.

7. The method of preparing 3-hydroxy-3-methyl-4-chloro-7-methoxyphthalide which comprises contacting 3-methyl-3-hydroxy-7-methoxyphthalide with chlorine in an inert solvent.

8. A method of preparing compounds represented by the formula:

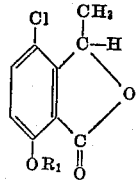

wherein $R_1$ represents a lower alkyl radical, which comprises contacting a compound represented by the formula:

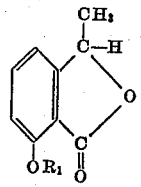

in which $R_1$ is as defined above, with chlorine in an inert solvent.

9. The method of preparing 3 - methyl - 4 - chloro - 7 - methoxyphthalide which comprises contacting 3 - methyl- 7 - methoxyphthalide with chlorine in an inert solvent.

10. A method of preparing compounds represented by the formula:

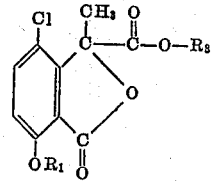

wherein $R_1$ represents a lower alkyl radical and $R_3$ represents a lower alkyl radical, which comprises contacting a compound represented by the formula:

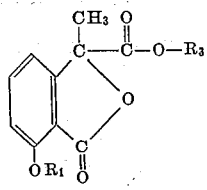

in which $R_1$ and $R_3$ are as defined above, with chlorine in an inert solvent.

11. The method of preparing ethyl 3 - methyl - 4 - chloro - 7 - methoxyphthalide - 3 - carboxylate which comprises contacting ethyl 3 - methyl - 7 - methoxyphthalide - 3 - carboxylate with chlorine in an inert solvent.

References Cited in the file of this patent
UNITED STATES PATENTS 2,150,595    Austin et al. _____ Mar. 14, 1939